United States Patent [19]

Simpson

[11] Patent Number: 4,525,967
[45] Date of Patent: * Jul. 2, 1985

[54] SUPPORT SPACER APPARATUS FOR A BUILT-UP ROOF

[75] Inventor: Harold G. Simpson, Oklahoma City, Okla.

[73] Assignee: Encon Products, Inc., Oklahoma City, Okla.

[*] Notice: The portion of the term of this patent subsequent to May 18, 1999 has been disclaimed.

[21] Appl. No.: 294,329

[22] Filed: Aug. 19, 1981

Related U.S. Application Data

[63] Continuation-in-part of Ser. No. 93,173, Nov. 13, 1979, Pat. No. 4,329,823.

[51] Int. Cl.³ .............................................. E04B 1/74
[52] U.S. Cl. ...................................... 52/404; 52/408; 52/410
[58] Field of Search ................ 52/508, 404, 407, 410, 52/478, 408, 694, 741, 409

[56] References Cited

U.S. PATENT DOCUMENTS

| | | | |
|---|---|---|---|
| 2,308,080 | 1/1943 | Herr | 52/694 |
| 2,861,525 | 1/1958 | Curtis et al. | |
| 3,029,172 | 4/1962 | Glass | 52/409 X |
| 3,694,306 | 9/1972 | Fricklas | 52/408 X |
| 3,900,995 | 8/1975 | Ehrenberg | 52/480 X |
| 4,075,807 | 2/1978 | Alderman | 52/407 |
| 4,081,938 | 4/1978 | Bertacchi et al. | 52/410 |
| 4,329,823 | 5/1982 | Simpson | 52/407 |

Primary Examiner—Carl D. Friedman
Attorney, Agent, or Firm—Bill D. McCarthy

[57] ABSTRACT

In a system providing effective insulation for a built-up roof, and a method for installing the same, a layer of insulation is supported on the secondary structural members of a building structure beneath the deck on which the built-up roof is constructed. The thermal characteristics of the insulation layer are retained by supporting the deck from the secondary structural members with support spacer assemblies comprising spacer members having a plurality of fastener assemblies connected thereto. The fastener assemblies may be extended through the insulation and attached to the secondary structural members so that the insulation is retained substantially in its pre-penetration state after attachment of the fastener assemblies.

5 Claims, 8 Drawing Figures

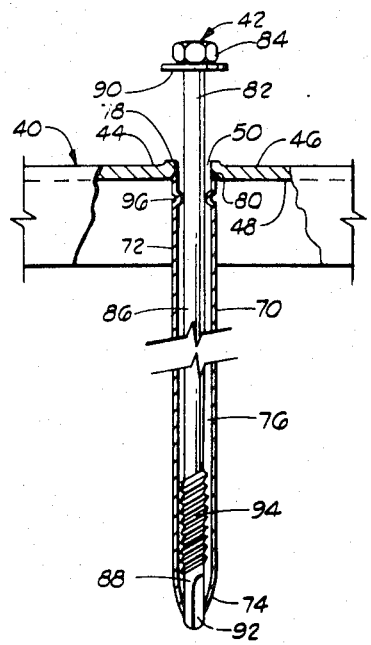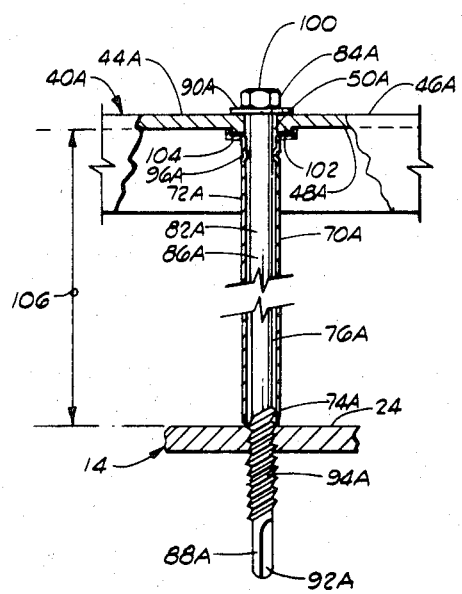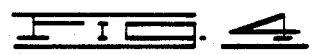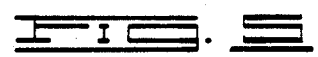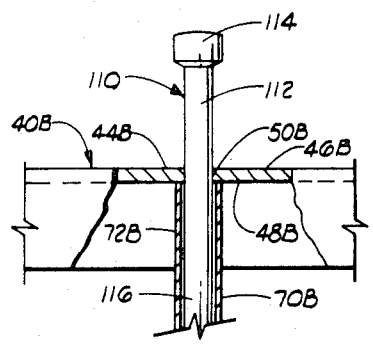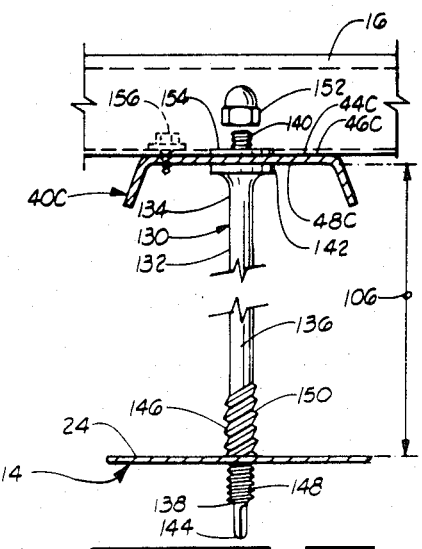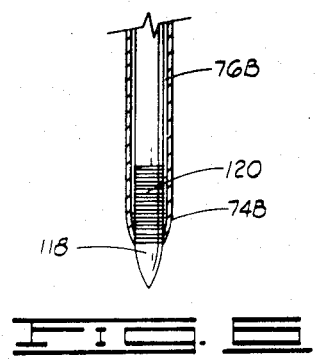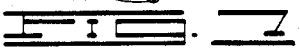

SUPPORT SPACER APPARATUS FOR A BUILT-UP ROOF

CROSS REFERENCE TO RELATED APPLICATION

The application is a continuation-in-part of U.S. patent application Ser. No. 93,173, entitled SUPPORT SPACER APPARATUS, filed Nov. 13, 1979, and now U.S. Pat. No. 4,329,823.

BACKGROUND OF THE INVENTION

1. Field of Invention

The present invention relates generally to the field of built-up roofing for buildings, and means for supporting such built-up roofing so as to permit the effective insulation of the building.

2. Discussion of the Prior Art

A large percentage of the buildings throughout the world use built-up roofs, which are built up from a deck which is in turn secured, generally by spot welding, to secondary structural members such as bar joists. A built-up roof generally comprises one or more waterproof membrane layers which are adhesively secured to a base support carried by the deck or, alternatively, are secured directly to the deck.

In prior art built-up roof constructions, insulation of the built-up roof has been accomplished by including one or more layers of insulation material in the layers of material stacked above the deck to form the built-up roof. Since insulation generally depends on the presence of gas pockets to reduce heat transfer, it tends to be light, compressible and of low structural strength. Inclusion of insulation layers in a built-up roof thus tends to reduce its strength, rendering it vulnerable to tears, punctures and damage from foot traffic and the like. While a more rigid insulation layer may be provided to reduce the incidence of these problems, such a rigid layer tends to be correspondingly less satisfactory from a heat transfer standpoint.

SUMMARY OF THE INVENTION

In the present invention, the problems associated with insulation of prior art built-up roofs have been solved by providing an insulation layer which extends between the deck and the secondary structural member, rather than above the deck as in prior art systems. Support spacer devices are provided for transferring load from the deck to the secondary structural members, while maintaining the deck in adjacent, noncrushing relationship with the insulation layer. The present invention also has application to the construction of walls.

BRIEF DESCRIPTION OF THE DRAWINGS

FIG. 4 is a side elevational, partially cut away view of a fastener assembly constructed in accordance with the present invention.

FIG. 6 is a side elevational, partially cut away view of another fastener assembly constructed in accordance with the present invention.

FIG. 7 is a side elevational, partially cut away view of another fastener assembly constructed in accordance with the present invention.

FIG. 8 is a side elevational, partially cut away view of another fastener assembly constructed in accordance with the present invention.

DESCRIPTION

Figure 1:
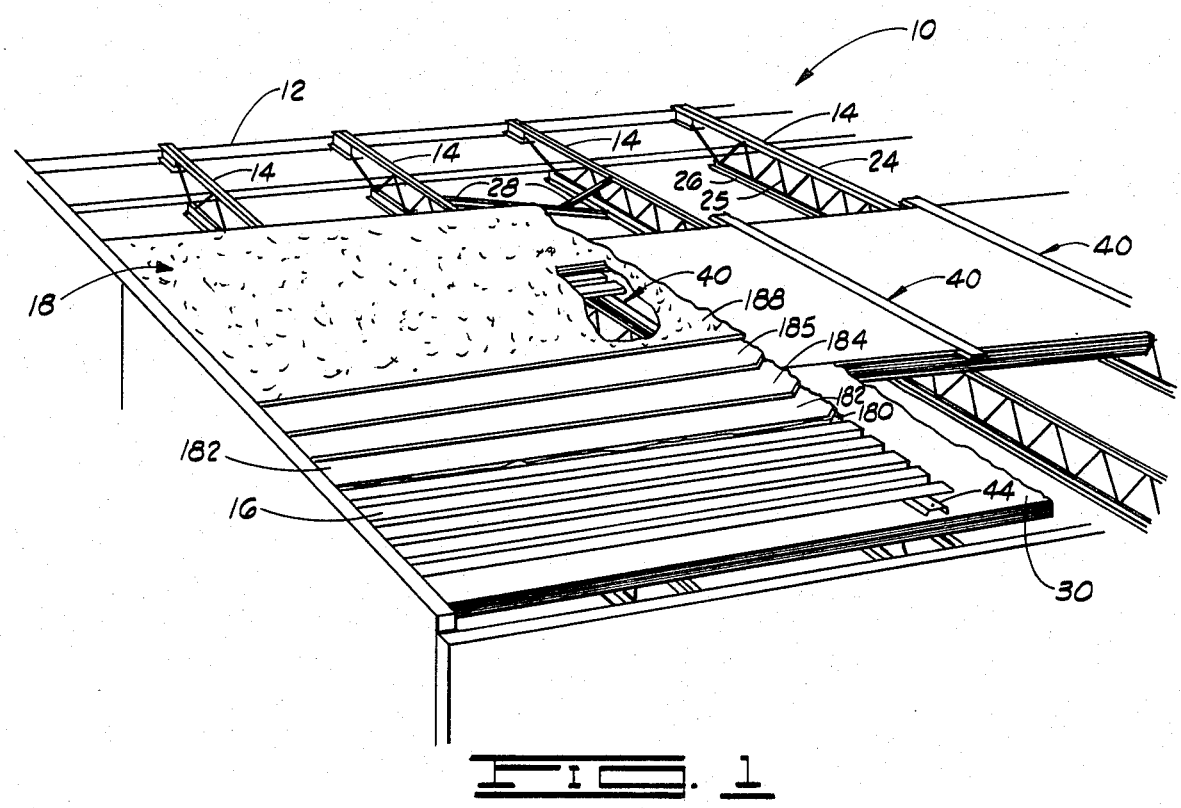
FIG. 1 is a semi-detailed view of a building roof constructed in accordance with the present invention. Various components of the roof, including the built-up roof assembly, the deck and the insulation layer, have been partially cut away to permit better display of other components of the invention.

Referring to the drawings in general, and in particular to FIG. 1, shown therein and designated by the numeral 10 is a portion of the roof of a building constructed in accordance with established methods of erection and as modified by the practice of the present invention. While the present invention will be described with regard to built-up roofs, it will be understood that the structure and method disclosed herein are applicable to wall construction as well. As used herein, the term "built-up roofing" will refer to built-up membrane means supported in the manner hereinbelow described either as an exterior roof or wall for a building. Also, the term "roof assembly" will be used for convenience to refer to either a roof or wall constructed in accordance with the present invention.

The building roof 10 comprises, in part, a plurality of primary structural members 12, a plurality of secondary structural members 14, and a plurality of overlapping corrugated deck members 16. The primary structural members 12 comprise vertically extending column members (not shown) and generally horizontally extending rafter members supported by the column members. The secondary structural members 14 are bar joists having upper and lower cords 24 and 26 interconnected by a web 25. The bar joists 14 may be interconnected and braced by cross-bridging 28, such as light gauge angle members. Alternatively, the secondary structural members 14 may comprise purlins, or other conventional structural beams. For purposes of the present disclosure, the upper cord 24 will also be referred to as a platform surface.

The deck members 16 are supported indirectly, in the manner described hereinbelow, by the secondary structural members 14 which extend substantially the length of the building roof 10 and which are connected to the primary structural members 12 via conventional connectors (not shown). Supported on the deck members 16 is a built-up roof assembly 18, which functions to protect the deck members 16, and thus the interior of the building, from atmospheric conditions and intrusion of moisture. The built-up roof assembly 18 will be described in greater detail hereafter. Other details of the building depicted in FIG. 1 either are not described or are omitted from the drawings in order to simplify the present disclosure.

The present invention involves extension of insulation material 30 beneath the deck members 16, and above the secondary structural members 14, with the integrity of the insulation material being substantially maintained following securement of the deck members 16 to the secondary structural members 14. For the case at hand, the supported structure is one or more deck panels, and the supporting substrate will be provided by a plurality of secondary structural members. A support spacer apparatus, which has previously been described in my U.S. patent application Ser. No. 93,173, serves as a spacer apparatus which bridges between the deck members 16 and the underlaying secondary structural members 14.

With reference to FIG. 1, it will be noted that the deck members 16 are supported by a plurality of support spacer apparatus 40 which are secured to the upper cords 24 of the secondary structural members 14. That is, in FIG. 1, the deck members 16 are not attached directly to the underlaying secondary structural members 14, as taught by established prior art practice. Rather, the deck members 16 shown in FIG. 1 are attached to the plural support spacer apparatuses 40. Each of the support spacer apparatuses 40 is attached to its respective secondary structural members 14 via fasteners that extend through the insulation material 30 in a manner made more clear by reference to FIG. 2.

Figure 2:
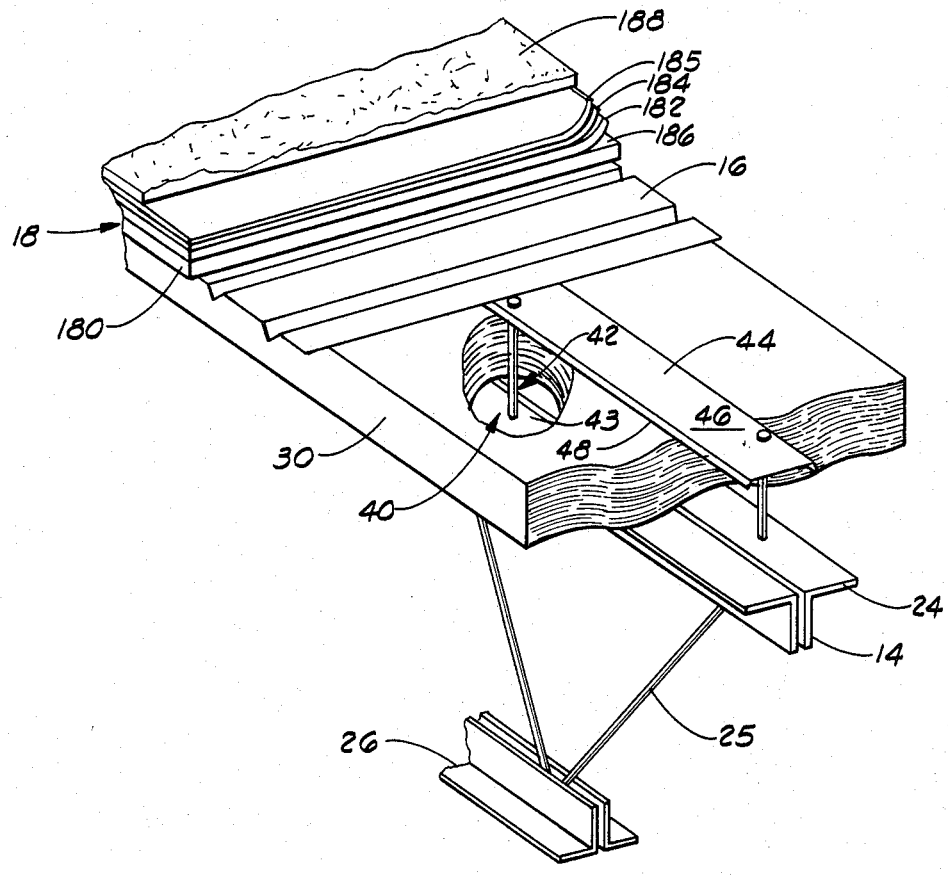
FIG. 2 is a partially cut away, perspective view of a support spacer apparatus of the present invention, also showing a deck member, a secondary structural member, and the built-up roof assembly. Portions of the insulation, the deck member, the secondary structural member and the built-up roof assembly have been partially cut away to facilitate display of the invention.

Shown in FIG. 2 is an enlarged portion of a secondary structural member 14 (sometimes hereinafter referred to as a bar joist) with a portion of insulation material 30 shown supported on the upper cord 24 thereof. The insulation 30 preferably comprises compressible roll glass fiber material having a waterproof facing (not shown) attached on one side thereof. A portion of a support spacer apparatus 40 is shown, along with portions of overlaying deck members 16 depicted above the support spacer apparatus 40, which is fastened to the upper cord 24 of the bar joist 14 by a fastener assembly 42. The insulation 30 is shown partially removed at 43 so as to permit the better display of the fastener assembly 42.

Figure 3:
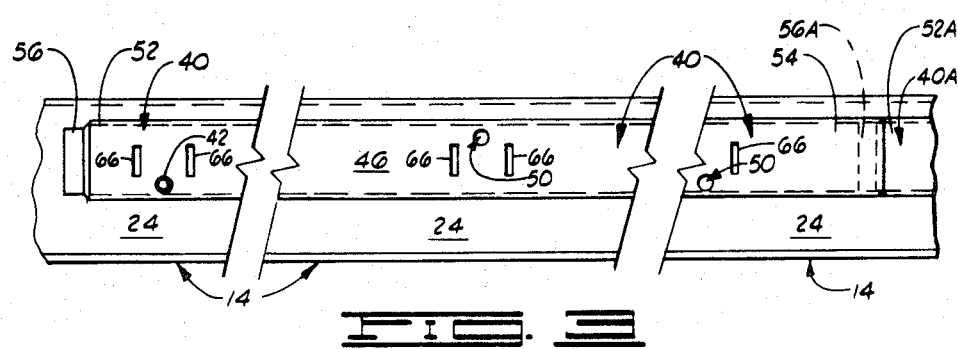
FIG. 3 is a top plan view of the support spacer apparatus of FIG. 2 with the insulation removed to show the secondary structural member beneath the support spacer apparatus.

The support spacer apparatus 40 comprises a channel shaped spacer member 44 having an upper first support surface 46 and a lower, oppositely disposed second support surface 48. As best shown in FIG. 3, the spacer member 44 has a plurality of fastener apertures 50 communicating through it from the first support surface 46 to the second support surface 48. The fastener assemblies 42 extend through the fastener apertures 50 to attach to the underlying substrate or bar joist 14 in the manner described more fully hereinbelow. While the locations of the fastener apertures 50 may assume a variety of layout patterns, the offset pattern shown in FIG. 3 is believed to be beneficial in providing stable securement of the support spacer apparatus 40 to the bar joist 14; that is, by staggering the locations of the fastener apertures 50 from side-to-side along the length of the spacer member 44, the support spacer apparatus 40, once attached to the bar joist 14 via the fastener assemblies 42, will have greater stability to an imposed load.

The support spacer apparatus 40 shown in broken view in FIG. 3 has a first end 52 and a second end 54, a portion of the first end 52 being shaped in the form of a protruding tang 56. Also shown in FIG. 3 is a second support spacer apparatus 40A which is disposed in end-to-end alignment with the support spacer apparatus 40. The support spacer apparatus 40A is identical in construction detail to the support spacer apparatus 40 and is shown having a protruding tang 56A, extensive from a first end 52A thereof, received in the channel web of the support spacer apparatus 40 at the second end 54. In like manner, the protruding tang 56 of the support spacer apparatus 40 is receivable in another support spacer apparatus (not shown) which will be disposed in end-to-end alignment therewith such that a plurality of support spacer apparatuses interjoin to provide a continuously extending upper first support surface 46 along the length of the supporting bar joist 14. This interjoining feature serves to provide stability of the support spacer apparatuses 40 supported by a single bar joist 14, and further, this interlocking feature of the support spacer apparatus 40 serves to provide a guide means to a workman as he interlocks each support spacer apparatus 40 to those already attached to the underlaying bar joist 14 during installation.

Each support spacer apparatus 40 has a plurality of fastener assemblies 42 which are designed to penetrate the insulation material 30 and connect to the bar joist 14. Shown in FIG. 4 is an enlarged view of one of the fastener assemblies 42 in partially cut away detail and depicted in an assembled position with the spacer member 44 (but prior to attachment to a substrate or bar joist 14).

The fastener assembly 42 depicted in FIG. 4 comprises a column member 70 having a first end 72 and a second end 74, the column member 70 also having a bore or channelway 76 extending from the first end 72 to the distal second end 74. Each of the fastener apertures 50 is tubulated such that the internal surface 78 of the fastener aperture 50 is flared away from the first support surface 46 in the manner shown. This provides a recess 80 to receive the first end 72 of the column member 70, and the first end 72 is wedged or welded in the recess 80. The column member 70, as configured in FIG. 4, is a tube column which is connected to the spacer member 44 at its first or attachment end 72, and which is tapered at its distal second end 74. The channelway 76 is substantially axially aligned and communicates with the fastener apertures 50 with which it is associated.

The fastener assembly 42 also comprises an elongated fastener member 82 which has a first end 84, a body portion 86 and a second end 88. The first end 84 has a bolthead configuration and is optionally provided with a washer 90. The second end 88 serves as a self-drilling-/self-tapping screw and comprises a drill bit end 92, the body portion 86 having a threaded portion 94 disposed in near proximity to the drill bit end 92.

As depicted in FIG. 4, the fastener member 82 is disposed with its body portion extending through the fastener aperture 50 and the channelway 76. The tapered second end of the tube column 70 partially closes the channelway 76 sufficiently to receive the drill bit end 92 in a friction fit therewith, permitting the distal second end 88 to partially protrude from the end of the channelway 76. This arrangement provides for the retention of the fastener member 82 in an assembled position with the tube column 70 in a ready profile for penetration of the insulation material 30 and for securement to the bar joist 14.

If desired, the column member 70 can be provided with internal pressure points to assist in retaining the fastener member 82 in the assembled position, such as is provided by the crimped portion 96 in the column member 70. Once the body portion 86 is positioned in the assembled position depicted in FIG. 4, the column member 70 is crimped at some convenient position clear of the threaded portion 94. Of course, other methods of securing the fastener member 82 within the column member 70 may be practiced, with the object thereof being the securement of the fastener assembly 42 to the beam of the spacer member 44 so that the fastener assembly is maintained in the depicted assembled position until attached to a bar joist or other underlaying structural member.

Figure 5:
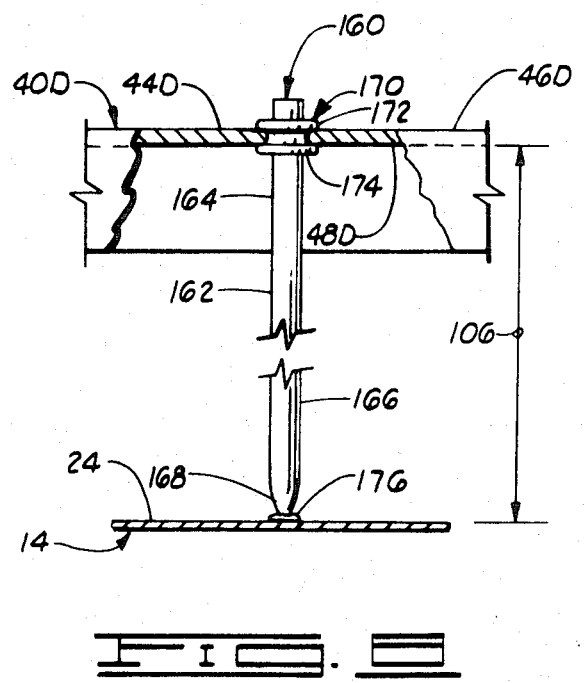
FIG. 5 is a side elevational, partially cut away view of another fastener assembly constructed in accordance with the present invention.

FIG. 5 shows an alternative fastener assembly 100 which is very similar to the fastener assembly 42 shown in FIG. 4, the fastener assembly 100 shown in an attached position with a secondary structural member 14 in FIG. 5. The numeral designations in FIG. 5 having a suffix "A" indicate similar or identical components to those described for the fastener assembly 42. That is, the fastener assembly 100 comprises a column member 70A having a first end 72A, a second end 74A, and a channelway 76A. The fastener assembly 100 is shown assembled to a modified support spacer apparatus 40A which has a plurality of fastener apertures 50A, each of which is identical to the fastener aperture 50 shown in FIG. 4 and each of which has a peripheral ridge 102 extending from the second support surface 48A. The tip 104 of the first end 72A is flared and dimensioned to receive the ridge 102 therewithin, and the column member 70A is secured to the spacer member 44A in any convenient manner, such as by welding or by a friction fit of the ridge 102 and the flared tip 104.

The fastener assembly 100 also comprises an elongated fastener member 82A which is identical to the previously described fastener member 82 and need not be described further herein. As noted, the fastener assembly 100 is shown in its attached position, meaning that the fastener assembly 100 has been actuated to interconnect the support spacer apparatus 40A and the bar joist 14 in the manner shown in FIG. 5. That is, the fastener member 82A is shown after it has drilled a hole by forcefully rotating its first or headed end 84A with an appropriately sized wrench while the drill bit end 92A is engaged with the upper cord 24 of the bar joist 14. Once the drill bit end 92A has drilled through the upper cord 24, the continued rotation of the first end 84A causes the threaded portion 94A to engage the newly drilled hole, and further rotation of the fastener member 82A is performed until the distal, second end 74A of the column member 70A is brought into contact with the upper cord 24. At this point, the first or headed end 84A of the fastener member 82A and the washer 90A (if provided) has been brought into pressing engagement with the top or first support surface 46A of the support spacer apparatus 40A. This result is effected by determining the dimensional proportions of the fastener assembly 100 such that the threaded portion 94A of the fastener member 82A retains threading engagement with the upper cord 24 when the second end 74A of the column member 70A comes into pressing engagement with the upper cord 24. Furthermore, the dimensional proportions of the fastener assembly 100 are established such that the distance 106 between the top surface of the upper cord 24 and the second support surface 48A of the support spacer apparatus 40A, once the fastener member 82A is adequately tightened to the upper cord 24, is approximately equal to, or somewhat greater than, the thickness of the insulation blanket 30. Of course, it will be recognized that the dimensional proportions of the fastener assemblies 42, 100 may be altered as desired to accommodate the insulation being installed.

Returning to FIGS. 1 and 2, it will be recalled that a plurality of support spacer apparatuses 40 are interconnected in end-to-end alignment so as to provide a continuous upper first support surface 46 extending above each bar joist 14. A plurality of deck members 16 may be installed in overlapping relationship on these upper surfaces by conventional connectors, or by spot welds, so as to form a continuous deck supported by the upper support surfaces 46 of the spacer members 44 of the support spacer apparatuses 40. The deck members 16 may either be corrugated, as shown in the Figures, or substantially flat.

As best shown in FIG. 2, the built-up roof assembly 18 comprises a base support 180, such as a thin, flat sheet of wood, supported on the deck members 16. Disposed above the base support 180 are a first waterproof membrane 182, preferably comprising a felt layer, an overlaying second waterproof membrane 184, also preferably comprising a felt layer and an overlaying third waterproof membrane 185, also preferably comprising a felt layer. It will be understood that the number of waterproof membranes can be varied from a single such membrane to any number selected for a particular application. The first waterproof membrane 182 is secured to the base support 180 by an adhesive 186. Adhesive is also used to secure the second and third waterproof membranes to the respective underlaying membranes. A layer of gravel and tar 188 is provided to overlay the third waterproof membrane 185. If desired, one or more layers of solid insulation material may be included as additional layers of the built-up roof assembly 18.

If the deck members 16 are not corrugated and are instead substantially flat, the base support 180 may be dispensed with, and the adhesive 186 utilized for securing the first waterproof membrane 182 directly to the deck members 16.

OPERATION

The insulation of the building roof 10 utilizing the present invention will now be described beginning at the point in time during the construction of the building that the bar joists 14 have been positioned and attached to the primary structural members 12. Typically, the insulation blanket 30 will be rolled over the bar joists 14 so that one or more widths of the blanket extend continuously from one side of the building to the other side of the building. Once in place, each of the widths of insulation blanket 30 is cut to required length and weighted at each of its ends so as to tautly stretch each width of insulation over the rows of bar joists. The installing workman then places a row of interconnected support spacer apparatuses 40 along each bar joist 14 in the following manner.

The installation of the roof 10 utilizing the present invention will be described with reference to the support spacer apparatus 40 which has been described with reference to FIGS. 2 through 4, and it will be understood that the description will apply as well to the support spacer apparatus 40A of FIG. 5. Each support spacer apparatus 40 will be pre-assembled prior to use with the roof 10; that is, each of the fastener apertures 50 of the support spacer apparatuses will have a fastener assembly 42 associated therewith in the assembled position as depicted in FIG. 4. The first support spacer apparatus 40 to be placed at the edge of the bar joist 14 will be generally aligned with the longitudinal axis of the bar joist 14 to which it is to be attached and positioned with the drill bit ends 92 of all of its fastener assemblies 42 resting upon the top layer of the insulation 30, the bottom layer of the insulation 30 being, in most cases, a moisture impregnable vapor barrier which is normally a vinyl film reinforced with some type of fiber. By pressing the support spacer apparatus 40 toward the underlaying bar joist 14, the drill bit ends 92 will easily penetrate the insulation and its vapor barrier, causing minimal disturbance to either the insulation or its vapor barrier. As the fastener assemblies 42 are pushed through the insulation 30, the drill bit ends 92 will come to rest against the upper cord 24 of the bar joist 14.

The alignment of the longitudinal axis of the initially placed support spacer apparatus 40 can be achieved visually, or the proper alignment can be determined by the use of an aligning tool (not shown). This aligning tool is placed so as to abut with the end of a bar joist, and it should provide an aligning tang protrusion, similar to the protruding tang 56 of the support spacer apparatus 40 shown in FIG. 3, which will be receivable within the channel portion of the second end 54 of the support spacer apparatus initially being positioned on the underlaying bar joist 14. Of course, instead of an aligning tool being used to achieve the alignment of the initially positioned support spacer apparatus 40, an aligning tang protrusion can as well be provided by attaching or forming a guide member at one or both ends of each bar joist 14, with the guide member having a protruding tang or the like, which serves to guide the placement of the initially positioned support spacer apparatus.

Whether the alignment of the first placed support spacer apparatus on each bar joist is visually determined or is determined by reference to an aligning tang protrusion, it is anticipated that the longitudinal alignment of the initial support spacer apparatus 40 will be achieved somewhat simultaneously with pushing the fastener assemblies 42 through the insulation 30. Once the drill bit ends 92 are resting against the upper cord 24 of the underlaying bar joist 14, the longitudinal alignment having been determined, the installer can effect attachment to the upper cord 24 by applying rotational energy to the fastener members 82 via an appropriate tool in rotating engagement with the headed first end 84 of each of the fastener assemblies 42.

After the initial support spacer apparatus has been attached to a particular bar joist 14, the second support spacer apparatus 40 can be easily positioned by placing the channel of its second end 54 over the protruding tang 56 of the first end 52 of the already positioned support spacer apparatus 40. Once this interlocking step is accomplished, the fastener assemblies 42 of the second support spacer apparatus 40 are positioned to extend through the insulation 30 in the manner described for the first placed support spacer apparatus 40. With this completed, the fastener assemblies 42 of the second support spacer apparatus 40 can be tightened to securely attach it to the upper cord 24. Once attached to the upper cord 24, the second support spacer apparatus is ready to receive the next support spacer apparatus to be placed in line therewith. These steps are repeated until a row of aligned support spacer apparatuses 40 extend the combined distance of the widths of the insulation 30. In this way, the alignment of the first placed support spacer apparatus 40 serves to guide the placement of the succeeding support spacer apparatuses 40 along the length of the bar joist 14. In like manner, a row of support spacer apparatuses 40 is provided for each of the bar joists.

Once the support spacer apparatuses 40 are in place, the deck members 16 may be positioned onto the first support surfaces 46 of the installed and aligned support spacer apparatuses 40, and the deck members 16 can be attached to the support spacer apparatuses 40 via conventional screw members. In fact, installation of the deck members 16 is made much easier with the use of the support spacer apparatuses 40 constructed in accordance with the present invention. For one thing, the rows of axially aligned support spacer apparatuses 40 attached along the bar joists 14 serve as a solid underlaying support substrate and provides a solid footing for the deck members. Further, these aligned support spacer apparatuses provide the installer with a visual guide to aid in the placement of screw members through the deck members 16, providing him confidence that each screw member used to fasten the deck members 16 will be anchored to underlaying solid structural members, which in this case, will be the underlaying support spacer apparatuses 40.

As the fastener assemblies 42 are caused to penetrate the insulation 30, the pre-penetration integrity of the insulation is substantially maintained since the fastener assemblies 42 cause minimal disturbance to the insulation material. Rotational energy applied to the headed ends 84 of the fastener members 82 serve to vibrate the loose insulation fibers, causing the insulation to "fill out", and since the elongated fastener assemblies 42 are relatively small in relation to the supported areas of the support spacer apparatuses 40, the insulation is substantially unchanged from its pre-penetration characteristics. Thus, each support spacer apparatus 40 operates to transfer load from the deck member 16, and the spacer members 44, while maintaining the deck member 16 in adjacent, noncrushing relationship with the insulation layer 30.

Once the deck members 16 are installed onto the first support surfaces 46 of the spacer members 44, and are properly connected so as to form a substantially continuous deck, the built-up roof assembly 18 may be installed. If the deck members are corrugated, a base support 180 is installed, and is thereafter adhesively secured, as by the adhesive 186, to the first waterproof membrane 182. If the deck is not corrugated, adhesive may be used to secure the first waterproof membrane 182 directly to the deck members. If more than one membrane is used in constructing the built-up roof, additional adhesive may be used to secure the other membranes, such as the second and third waterproof membranes 184 and 185, to the first waterproof membrane 182. Installation of the built-up roof assembly 18 may be completed by laying down the gravel layer 188 atop the upper membrane, which is the third waterproof membrane 185 in FIGS. 1 and 2.

OTHER ALTERNATIVE FASTENER ASSEMBLIES

In addition to the above described fastener assemblies 40 and 100, several alternative fastener assemblies will now be described with reference to FIGS. 6 through 8. Since each of these fastener assemblies will be utilized with support spacer apparatuses identical or similar to the support spacer apparatus 40 described above, it will be sufficient for the purpose of this disclosure to provide some examples of the types of fastener assemblies that, when used in combination with appropriately shaped spacer members, will achieve the objects of the present invention. Further, the alternative embodiments of the fastener assemblies of FIGS. 6-8 are not meant to be limiting, except in the general scope of normally recognized structural equivalency, to the scope of the present invention.

In FIG. 6, a support spacer apparatus 40B is shown which has a plurality of fastener apertures 50B, only one of which is shown in the partial view. A fastener assembly 110 is provided, the fastener assembly 110 comprising a column member 70B having a first end 72B, a second end 74B, and a channelway 76B extending from the first end 72B to the distal second end 74B. The fastener assembly 110 also comprises an elongated fastener member 112 which is generally in the form of an enlarged nail, with the fastener member 112 having a headed first end 114, a body portion 116 and a pointed second end 118. The first end 114 generally has a nail head configuration and may be provided with a washer (not shown). The second end 118 serves as a penetrating end for penetrating both the insulation 30 and the upper cords 24 of the bar joists 14, and the body portion 116 has a ridged portion 120 disposed in near proximity to the tapered or pointed end 118.

As depicted in FIG. 6, the fastener member 112 is disposed with its body portion 116 extending through the fastener aperture 50B and the channelway 76B. The tapered second end of the tube column 70B partially closes the channelway 76B sufficiently to receive the tapered second end 118 in a friction fit therewith, permitting the distal second end 118 to partially protrude from the end of the channelway 76B. This arrangement provides for the retention of the fastener member 112 in an assembled position with the tube column 70B in a ready profile for penetration of the insulation material 30 and for securement to the bar joist 14.

In order to secure the column member 70B in the position depicted in FIG. 6 (that is, in its pre-penetration position), the tube column 70B can be attached to the second support surface 48B of the support spacer apparatus 40B, or alternatively, the fastener aperture 50B can be dimensioned to receive the body portion 116 of the fastener member 112 in a friction fit to retain the fastener member 112 in the position depicted, in which case there will be no need for attaching the tube column 70B to the spacer member 44B. Additionally, the tube column 70B can be provided with internal pressure points to assist in retaining the fastener member 112 in its assembled position.

The fastener member 112 may be driven into the upper cord 24 of a bar joist 14 by the application of striking force applied to the first end 114; however, it is anticipated that the fastener member 112 can be motivated into a driving engagement with an underlaying bar joist by the application of air pressure exerted by a conventional air driver. Once the fastener member 112 is caused to penetrate an underlaying bar joist, the first end 114 will be positioned in pressing engagement with the first support surface 46B, the ridge portion 120 will come to rest in locked engagement with the hole provided by the penetration of the second end 118, and the ridge portion 120 will provide resistance to removal of the fastener member 112 from attaching engagement with the penetrated bar joist. While the ridges of the ridge portion 120 are shown as circumferential ridges, it will be recognized that other ridge configurations can be utilized. Once the fastener member 112 is driven into the attached position with an underlaying bar joist, the tube column 70B will assume the same position as that described above for the tube column 70A depicted in FIG. 5.

Another embodiment of a fastener assembly usable in the present invention and designated by the numeral 130 is shown in FIG. 7 in an attached position with the spacer member 44C of the support spacer apparatus 40C and with the underlying bar joist 14. The fastener assembly 130 features integral column and fastener member components, as the fastener assembly 130 comprises a fastener member 132 having a first end 134, a body portion 136 and a second end 138. The first end 134 has a threaded portion 140 that extends through a fastener aperture (not shown) in the spacer member 44C, the diameter of the fastener aperture being large enough to pass the threaded portion 140 but too small to receive the body portion 136. While the body portion of the fastener assembly 130 may serve as the stay member (the column member), a peripherally extensive shoulder portion 142 integrally formed with the body portion 136 may be provided to abut with the second support surface 48C of the spacer member 44C.

The second end 138 of the fastener assembly 130 is shaped in the configuration of a drill bit end 144, and the body portion 136 has a threaded portion 146 adjacent to the drill bit end 144. The threaded portion 146 has a first threaded part 148 and a second threaded part 150, the pitch of the threads of the first threaded part 148 being markedly different than the pitch of the threads of the second threaded part 150.

The cap nut 152 is provided and is threadingly receivable over the threaded portion 140. A washer 154 may be provided for placement on the threaded portion 140 between the cap nut 152 and the first support surface 46C of the spacer member 44C. The threaded bore of the cap nut 152 is dimensioned such that the extreme end of the threaded portion 140 will bottom out therein before the cap nut 152 is pressed into engagement with either the washer 154 or the first support surface 46C, if the washer 154 is not provided. This arrangement assures that the fastener member 132 is rotatable about its longitudinal axis in the fastener aperture of the spacer member 44C when the fastener assembly 130 is assembled thereto.

FIG. 7 shows the deck member 16 supported by the support spacer apparatus 40C and attached thereto by a sheet metal screw member 156. Also, the second end 138 of the fastener member 132 is shown attached to the upper cord 24 of the bar joist 14 in the attached position of the fastener assembly 130.

The operation of the fastener assembly 130 of FIG. 7 is very similar to the operation described above for the other fastener assemblies 42, 100 and 110 in that the fastener assembly 130 serves to support the spacer member 44C at a predetermined distance 106 from the upper cord 24. Once assembled to the spacer member 44C and positioned to extend through insulation (not shown in FIG. 7), the drill bit end 144 is caused to drill a hole through the upper cord 24 by rotation of the fastener member 132 by the application of rotational energy to the cap nut 152. Of course, it will be recognized that the direction of all of the threads of the fastener assembly 130 must be coordinated such that tightening movement of the cap nut 152 on the threaded portion 140 will drive the other threads in a tightening direction toward the upper cord 24 and continued rotation of the fastener member 132 will cause the first threaded part 148 to engage the drilled hole. As the rotation continues, the threaded part 148 will move through the hole, having threaded same, and the second threaded part 150 will be caused to engage the threaded hole. Since the threads are pitched differently on the threaded part 150, the threaded part 150 will be jammed in the hole drilled by the drill bit end 144 and threaded by the threaded part 148. At this point, cross threading will create a large resistance to further rotation, and rotation of the cap nut 152 should be terminated. The dimensional proportions of the fastener assembly 130 are established such that the second support surface 48C will be spatially determined to be at the distance 106 above the upper cord 24 once all of the fastener assemblies 130 of the support spacer apparatus 40C are so secured.

Yet another embodiment of a fastener assembly for use in the present invention and designated by the numeral 160 is shown in FIG. 8 in an attached position with the spacer member 44D and the bar joist 14. The fastener assembly 160 comprises an electrically conductive fastener member 162 which has a first end 164, a body portion 166 and a tapered second end 168. The first end 164 extends through the fastener aperture (not shown) of the spacer member 44D, and an insulator ring 170 is adhered to the first end 164, the insulator ring 170 being disposed to fill the fastener aperture while having oversized external ridge portions 172 and 174 extending from the fastener aperture to configure the insulator ring 170 in the general shape of a grommet. However, the insulator ring 170 is also adhered to the spacer member 44D both within the fastener aperture and at the first and second support surfaces 44D, 46D by the overlaping of the external ridge portions 172 and 174. The insulator ring 170, which may be an epoxy material with suitable insulative qualities, serves to secure the fastener member 162 to the spacer member 44D, and it also serves as a stay member to exert upward force against the second support surface 48D in the attached position of the fastener assembly 160.

The operation of the fastener assembly 160 when assembled to the spacer member 44D is as follows. Once the support spacer apparatus 40D is positioned so as to extend the fastener assemblies 160 thereof through the insulation 30 (not shown in FIG. 8) so that the tapered second ends 168 contact the upper cord 24 of the underlaying bar joist 14, each of the fastener assemblies 160 becomes an electrode and a weld bond 176 is formed between the second end 168 and the upper cord 24 by the application of electrical energy to the first end 164, which is extensive above the first support surface 46D. To accomplish the welding, a conventional welding apparatus can be utilized, and the fastener assemblies 160 of a support spacer apparatus 40D can be welded one at a time, or all at the same time by electrically interconnecting the extensive ends 164 of the fastener assemblies 160.

Changes may be made in various elements, assemblies and steps of the present invention without departing from the spirit and scope of the invention, as defined in the following claims.

What is claimed is:

1. A roof assembly for a building having a primary support structure supporting a first secondary structural member and a second secondary structural member, each secondary structural member having a platform surface, the roof assembly comprising:
   a layer of insulation, supported by the platform surfaces of the first and second secondary structural members;
   a deck disposed in spaced overlaying relation to the insulation layer and the first and second secondary structural members;
   first support spacer means, supporting the deck and operatively engaged to the first secondary structural member, for transferrng load from the deck to the first secondary structural member while maintaining the deck in adjacent, noncrushing relationship with the insulation layer, the first support spacer means comprising:
      a spacer member having a first support surface and an opposite second support surface, the spacer member having a plurality of fastener apertures formed therein; and
      fastener means for attaching the spacer member to the platform surface of the first secondary structural member, the fastener means comprising:
         a plurality of column members extending from the second support surface of the spacer member in an assembled position thereof, each column member having a channelway communicating with one of the fastener apertures and extending to the distal end of the column member, each column member maintainable in substantially nonpenetrating engagement with the platform surface of the first secondary structural member when the first support spacer assembly is in its installed position; and
         a plurality of fastener members extendable through the fastener apertures, each fastener member extendable through the channelway of one of the column members and attachable to the platform surface of the first secondary structural member so that the first support surface is disposed a predetermined distance from the platform surface in an attached position of the first support spacer means to the platform surface; and
   built-up roofing means, supported by the deck, for protecting the deck from atmospheric conditions and intrusion of moisture.

2. A roof assembly for a building having a primary support structure, comprising:
   a first secondary structural member, supported by the primary support structure, and having a platform surface;
   a second secondary structural member, supported by the primary support structural, and having a platform surface;
   a layer of insulation, supported by the platform surfaces of the first and second secondary structural members;
   a deck disposed in spaced, overlaying relation to the insulation layer and the first and second secondary structural members;
   first support spacer means, operatively engaged to the first secondary structural member, for transferring load from the deck to the first secondary structural member while maintaining the deck in adjacent, noncrushing relationship with the insulation layer, the first support spacer means comprising:
      a spacer member having a first support surface and an opposite second support surface, the spacer member having a plurality of fastener apertures formed therein; and
      fastener means for attaching the spacer member to the platform surface of the first secondary structural member, the fastener means comprising:

a plurality of column members extending from the second support surface of the spacer member in an assembled position thereof, each column member having a channelway communicating with one of the fastener apertures and extending to the distal end of the column member, each column member maintainable in substantially nonpenetrating engagement with the platform surface of the first secondary structural member when the first support spacer assembly is in its installed position; and a plurality of fastener members extendable through the fastener apertures, each fastener member extendable through the channelway of one of the column members and attachable to the platform surface of the first secondary structural member so that the first support surface is disposed a predetermined distance from the platform surface in an attached position of the first support spacer means to the platform surface; and built-up roofing means, supported by the deck, for protecting the deck from atmospheric conditions and intrusion of moisture.

3. A method of forming a roof or wall for a building having a primary structure supporting a first secondary structural member and a second secondary structural member, each secondary structure member having a platform surface, comprising:

installing a layer of insulation into resting position atop the platform surfaces so that the layer tautly extends between the first and second secondary structural members;

installing a first support spacer assembly, having a first support surface, so that the first support surface of the first support spacer assembly is disposed at a predetermined distance from, and in load-transferring relationship with, the platform surface of the first structural member, while the first support surface is maintained in adjacent non-crushing relationship with the insulation layer, the first support spacer assembly comprising a spacer member having a first support surface and an opposite second support surface, the spacer member having a plurality of fastener apertures formed therein, a plurality of column members, each having a channelway formed therein, and a plurality of fastener members, each extendable through a fastener aperture and through the channelway of column member, the installation of the first support spacer assembly comprising:

disposing each column member in extensive relationship to the second support surface of the spacer member, with the channelway of each column member communicating with a fastener aperture in the spacer member, each column member being maintained in substantially nonpenetrating engagement with the platform surface of the first secondary structural member after its corresponding fastener member is attached to the platform surface; and extending each fastener through a fastener aperture and its corresponding column member channelway, and attaching one end of the fastener to the platform surface of the first secondary structural member;

installing a deck on the first support surface of the first support spacer assembly; and installing a water proofing built-up roof on the deck.

4. A roof assembly for a building having a primary support structure supporting a first secondary structural member and a second secondary structural member, each secondary structural member having a platform surface, the roof assembly comprising:

a layer of insulation, supported by the platform surfaces of the first and second secondary structural members;

a deck disposed in spaced overlaying relation to the insulation layer and the first and second secondary structural members;

first support spacer means, supporting the deck and operatively engaged to the first secondary structural member, for transferring load from the deck to the first secondary structural member while maintaining the deck in adjacent, noncrushing relationship with the insulation layer, the first support spacer means comprising:

a spacer member having a first support surface and an opposite second support surface, the spacer member having a plurality of fastener apertures formed therein; and fastener means for attaching the spacer member to the platform surface of the first secondary structural member, the fastener means comprising:

a plurality of column members extending from the second support surface of the spacer member in an assembled position thereof, each column member is maintainable in substantially nonpenetrating engagement with the platform surface of the first secondary structural member when the first support spacer assembly is in its installed position; and a plurality of fastener members extendable through the fastener apertures and attachable to the platform surface of the first secondary structural member so that the first support surface is disposed a predetermined distance from the platform surface in an attached position of the first support spacer means to the platform surface, each of the column members being shaped to penetrate the insulation layer so that the characteristics of the insulation layer are substantially retained after the penetration of the column members therethrough, and wherein each fastener member is attachable to the platform surface of the first secondary structural member, through the intermediate insulation layer, by the application of energy to the end of the fastener member remote from the platform surface; and built-up roofing means, supported by deck, for protecting the deck from atmospheric conditions and intrusion of moisture.

5. The roof assembly of claim 4 in which the insulation layer comprises compressible roll glass fiber material having a waterproof facing attached to the side adjacent the platform surface of the first secondary structural member.

* * * * *